EFFECT OF TIME OF HEATING ON SOLUTION VISCOSITIES IN EXAMPLES 1 TO 3.

EFFECT OF TIME OF HEATING ON REDUCED
VISCOSITY OF THE POLYMER IN EXAMPLE 3.

3,642,703
METHOD OF IMPROVING THE STABILITY OF POLYURETHANE SOLUTIONS
Isamu Suzuki, Kiyoshi Ichikawa, Jyukichi Ohmura, and Hidemaro Iwashita, Shizuokaken, Japan, assignors to Asahi Kasei Kogyo Kabushiki Kaisha
Filed Aug. 7, 1968, Ser. No. 750,785
Claims priority, application Japan, Aug. 29, 1967, 42/54,998
Int. Cl. C08g 22/04
U.S. Cl. 260—77.5 AM     11 Claims

ABSTRACT OF THE DISCLOSURE

Highly concentrated polyurethane solutions, which are stable for a long period and have improved properties, are prepared (a) by reacting isocyanate-terminated prepolymers with specified chain extenders consisting of non-aromatic diprimary diamines and water in an organic solvent, the mole ratio of said diamines being 0.80 to 0.96 based on one mole of said prepolymers, while the mole ratio of water being equal to at least two times as much as 1 minus the mole ratio of said diamines, namely 0.08 to 0.40, based on one mole of said prepolymers, the chain extending reaction being effected by adding the prepolymer solution into the solution of chain extenders, and after the content of isocyanate groups in the reaction medium has fallen substantially to zero (b) by heating the reaction mixture at 60° C. to 85° C. for 5 to 30 hours with stirring.

Figure 1:
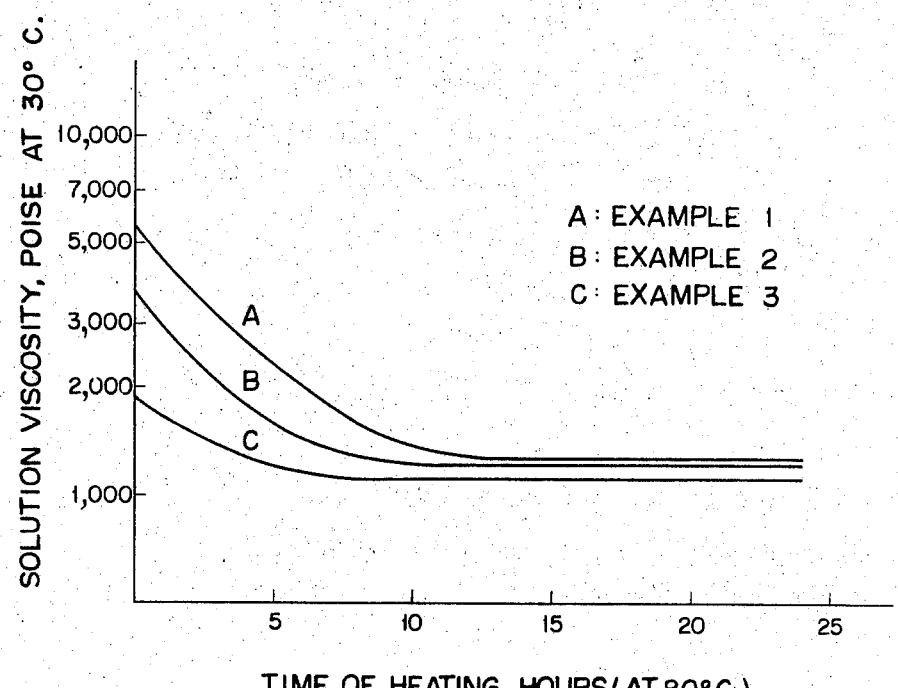

The elastic polyurethane products prepared from the solutions have good mechanical properties, high elastic recovery and improved stabilities against light, bleaching agents and strong hydrolytic media.

---

This invention relates to the method of improving the stability of polyurethane solutions and especially to the preparation of stable and highly concentrated polyurethane solutions which show reproducible viscosity behavior.

In accordance with this invention, these improved polyurethane solutions are prepared (a) by reacting isocyanate-terminated prepolymers prepared by the reaction one or more of organic diisocyanates and one or more polyhydroxy compounds having two terminal hydroxyl groups and having a molecular weight of about 500 to about 3,000, with specified chain extenders consisting of water and one or more non-aromatic diprimary diamines in an organic solvent, the mole ratio of said diamines being 0.80 to 0.96 based on one mole of said prepolymers, while the mole ratio of water being equal to at least two times as much as 1 minus the mole ratio of said diamines, namely 0.08 to 0.40, based on one mole of said prepolymers, with the chain extending reaction being effected by adding the prepolymer solution into the solution of chain extenders, and thereafter (b) by heating the reaction mixtures at 60° C. to 85° C. for 5 to 30 hours with stirring, until substantially no isocyanate groups have been detected in the reaction system.

It is well known that one of the most valuable polyurethane solutions may be prepared by reacting, in an organic solvent such as N,N-dimethylformamide, isocyanate-terminated prepolymers such as polyesterurethanes or polyetherurethanes with the chain extenders such as low molecular weight diamines. According to such known process, however, many difficulties lie in the fact that the viscosity behavior of the polyurethane solutions ultimately obtained varies widely and the uniformity of the solution viscosity is often disrupted during storage, exhibiting thixotropic phenomenon. Another difficulty is seen in relatively low solubility of polyurethanes in ordinary organic solvents, resulting in the low spinnability. These disadvantages are serious especially in the production of the elastic yarns by the spinning of the polyurethane solutions. In order to overcome the above-mentioned difficulties, for instance, the content of the isocyanate group may be reduced, but the elastic properties of the polyurethanes obtained tend to be limited to a low degree.

We have now found a novel process for the production of highly concentrated polyurethane solutions which are stable and show reproducible behaviors. The process comprises carrying out the chain extending reaction between isocyanate terminated prepolymers and a mixture of a specified amount of non-aromatic diprimary diamines and water, with some parts of the water reacting with the prepolymers as a chain extender while the remainder is allowed to be present in the free state; and after the content of isocyanate groups in the reaction medium has fallen substantially to zero heating the reaction mixture at 60° C. to 85° C. with stirring.

According to the present invention, polyurethane solutions obtained have good reproducibility of viscosity, improved solubility in organic solvents and usually show no coloration, compared with those of known polyurethanes chain extended by diamines alone. Moreover, on heating under the above-mentioned conditions, the solutions of the present invention are effectively stabilized and are capable of having high content of the polymers. By spinning these polyurethane solutions, elastic yarns may be easily prepared. The yarns are less tacky and characterized by increased strength and high elastic recovery even under severe conditions. They have also been found to have improved stability against light, strong hydrolytic media and chlorine containing bleaching agents, compared with the yarns from the known polyurethane solutions described above.

Examples of suitable polyhydroxy compounds having two terminal hydroxyl groups are conventional polyethers, polyesters, polyesteramides, polyesterurethanes and polyetheresters. Mixtures of the polyhydroxy compounds may also be used conveniently. Preferably, the said polyhydroxy compounds may be dried and have molecular weights of about 500 to about 3,000. They may be obtained by conventional methods. Their preparation is not an object of the present invention.

Examples of suitable organic diisocyanates, which are reacted with the polyhydroxy compounds to form said prepolymers, include aromatic diisocyanates such as 2,4-tolylene diisocyanate, 2,6-tolylene diisocyanate, p-phenylene diisocyanate, 4,4'-diphenylmethane diisocyanate, 3,3'-dimethyl-4,4'-diphenylmethane diisocyanate, 4,4'-diphenylene diisocyanate, 1,5-naphthylene diisocyanate; aliphatic diisocyanates such as trimethylene diisocyanate, tetramethylene diisocyanate, adipyl diisocyanate; aliphatic diisocyanates containing an aromatic ring such as p-xylylene diisocyanate, m-xylylene diisocyanate; cyclo-aliphatic diisocyanates such as methylene-bis-4,4'-cyclohexylisocyanate, isopropylidene-bis-4,4'-cyclohexylisocyanate, cyclohexane-1,4-diisocyanate. Mixture of two or more of said diisocyanates may also be used.

To prepare the isocyanate-terminated prepolymers, polyhydroxy compounds are reacted with an excess amount of diisocyanates in conventional manner. This reaction is carried out in the absence or the presence of organic solvents which are substantially inert to isocyanate groups and are capable of dissolving the formed polyurethanes at room temperature. Suitable organic solvents include N,N'-dimethyl formamide, N,N-dimethyl acetamide, N-methyl pyrrolidone, N,N'-tetramethyl urea, hexamethyl phosphoramide, tetramethylene sulfone and dimethyl sulfoxide.

The reaction between the isocyanate-terminated prepolymers and the chain extenders consisting of non-aromatic diprimary diamines and water is carried out in the following manner. The diamines, the total mole ratio of which preferably 0.80 to 0.96 based on one mole of the prepolymers, and water, whose mole ratio is preferably equal to at least two times as much as 1 minus the mole ratio of said diamines, namely 0.08 to 0.40 based on one mole of the prepolymers, are mixed in one or a mixture of two or more of said organic solvents to prepare the chain extender solution. Into the chain extender solution, the prepolymer solution is added with stirring. After substantially no isocyanate groups have been detected, the reaction mixture is heated at from 60° C. to 85° C. for 5 to 30 hours, with stirring.

Examples of suitable non-aromatic diprimary diamines are aliphatic diamines such as ethylene diamine, 1,2-propylene diamine, tetramethylene diamine, hexamethylene diamine; cyclo-aliphatic diamines such as 1,4-cyclohexane-bis-methylamine, 1,4-diaminopiperazine, 1,4-cyclohexane diamine, 4,4'-methylene-bis-cyclohexylamine; aliphatic diamines containing at least one aromatic ring such as p-xylylene diamine, m-xylylene diamine. Their hydrates may also be useful. When the hydrates are used, total amounts of water including that in the hydrates should be within the above-mentioned preferable range.

When the mole ratio of diamines is smaller than 0.80 based on 1 mole of the prepolymers, the polyurethanes obtained have low stretch modulus and low instantaneous elastic recovery.

On the other hand, if the mol ratio of diamines to prepolymer is greater than 0.96 based on 1 mole of the prepolymers, not only is the preparation of highly concentrated polyurethane solutions which are stable and reproducible very difficult, but also the polyurethanes formed have only limited stabilities against light, bleaching agents and hydrolytic media. When the mole ratio of water is smaller than that specified in the present invention, rather longer time is required in completing the chain extending reaction and the resulting polyurethane solutions are so viscous that a troublesome gelation occurs frequently, and further, these solutions are so unstable that the viscosity drops sharply on heating. However, too much amount of water causes low solubility of the formed polyurethanes. Where, the mole ratio of diamines is 0.80 based on 1 mole of the prepolymers, the mole ratio of water used is at most equal to 20 times as much as 1 minus the mole ratio of said diamines to prepolymers.

A further feature of the present invention lies in the manner of carrying out the reaction between prepolymers and chain extenders. Prepolymer solution is added into chain extender solution containing diamines and water with vigorous stirring. In this reaction system, diamines react with the prepolymers much faster than and then water subsequently reacts to complete the chain extending reactions. Therefore, the structure of the polyurethanes present in the resulting solutions is considered to be mainly composed of a new type of block copolymer (conjugated block copolymer). On the contrary if chain extender solutions are added into prepolymer solution, the polyurethanes formed differ from the abovementioned block copolymer, having no characteristic effects of the present invention.

Figure 2:
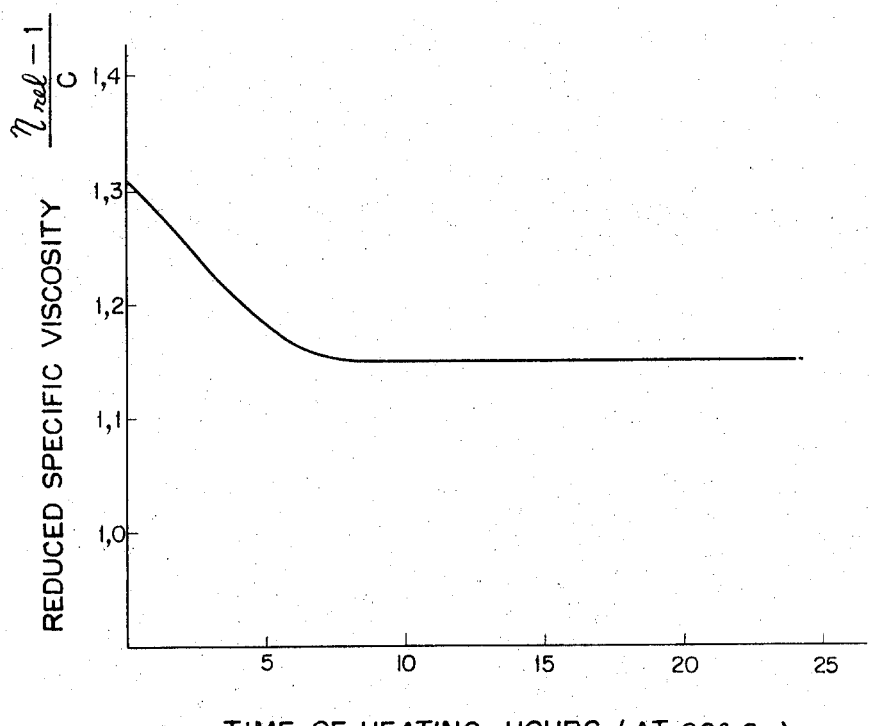

Further, the present invention is characterized by heating of the polyurethane solutions obtained. In the heating process described above, the solution viscosities are reduced to provide stable conditions, showing constant values in accordance with the reaction conditions adopted. Although the reduced viscosity of the polyurethane products is lowered to some extent by heating, it usually still has a value of above 1.0 enough to be useful for the polyurethane products. Reduced viscosity is defined as $$\frac{\eta_{rel}-1}{C}$$

in which $\eta_{rel}$ is the viscosity of the dilute solution of the polymer divided by the viscosity of the solvent in the same units and at the same temperature, and $C$ is the concentration in grams of the polymer per 100 ml. of solvent. The reduced viscosities recorded here are usually measured in N,N-dimethylacetamide. A concentration of 0.5 gram per 100 ml. of solvent was used. The behaviors of the solution viscosity and the reduced viscosity are also shown in FIG. 1 and FIG. 2. Such changes in structures and behavior of the polyurethane molecules in the heating process have not yet been known. However, stable, reproducible and highly concentrated polyurethane solutions are easily obtainable in the present invention, by using this heating process on the reaction system in which an excessive amount of water exists after the prepolymer solution has been added to the solution of chain extenders consisting of non-aromatic diprimary diamines and water. If the chain-extending reaction is carried out stepwise by first effecting the reaction between prepolymers and diamines and thereafter adding water to the resulting reaction system to effect the reaction therebetween, the heating process is unable to bring about the reproducibility of the viscosity of the resulting solutions. If heating of polymer solutions is effected at the temperature higher than 85° C., polyurethanes obtained decompose gradually in the solution, having no valuable effects mentioned above. On the other hand, if the heating is carried out below 60° C., the solution viscosities are tentatively stabilized after prolonged time; however, the viscosity behavior will again change undesirably in the treatments such as preheating effected prior to dry spinning process. If the time of heating is too short, although the heating is carried out at the preferable temperature described above, no stable polyurethane solutions are obtained. On the other hand, prolonged heating results in great loss of operation efficiency in the total preparation process. So 5 to 30 hours are preferred as the time of heating. If the heating process is adopted in the polymer solutions prepared by using diamines alone instead of a mixture of diamines and water as chain extender, undesirable deep coloration of the solutions tends to occur.

According to the invention, the polymer solutions having the content of high molecular weight polyurethanes up to from 20 to 55% can be prepared more easily than in the prior arts.

In order to improve dyeability and other important properties of polyurethane products, small portions of mono primary amines such as N,N-diethylaminopropylamine may be used together with the aforesaid chain extender. In these cases, the amount of prepolymers which are reacted with chain extenders should be reduced by the amount consumed with mono primary amines.

The highly concentrated and viscous solutions may work up in appropriate manner to yield highly elastic shaped articles especially filaments, films, sheets or synthetic leathers. The solutions may also be used desirably as coating agents and binders in situ. If necessary, conventional additives, such as dyes, pigments, stabilizers, anti-oxidants or other fillers, may be added to said solutions in order to give them better properties.

This invention represents an important development in which highly concentrated polyurethane solutions having stability for prolonged time of storage are easily obtainable with good reproducibility and in which the polyurethane products obtained from the solutions have good mechanical properties, high elastic recovery and improved stabilities against light, bleaching agents and strong hydrolytic media, compared with the usual polyurethane elastic materials.

The scope of the invention is readily understood by referring to the following examples, which are given for illustrative purposes only and should not be considered to represent the limits of the invention.

EXAMPLE 1

Poly(caprolactone)glycol (100.0 grams) with a molecular weight of 1,250 was reacted with 32.0 grams of 4,4'-diphenylmethane diisocyanate at 95° C. for 90 minutes under a stream of nitrogen, producing the corresponding isocyanate-terminated prepolymer.

After cooled to room temperature, the prepolymer was diluted with 150 grams of dry N,N-dimethylformamide. Then the prepolymer solution was added with vigorous stirring to a solution of 2.60 grams of ethylene diamine and 0.26 gram of water in 100 grams of N,N-dimethylformamide at room temperature. After 6 hours, the reaction mixture was heated at 80° C. and kept at this temperature for 12 hours, forming a viscous solution having a viscosity of 1,240 poises at 30° C. and good spinnability. The solution was extruded into a column of air (4 m. in length) heated to 210° C. through a 20-hole spinneret (0.12 mm. in diameter). The multifilaments were wound up at 320 m./min. and the spun filaments had the following properties: denier=280, tensile strength=0.80 g./d., tensile elongation=790%, stress relaxation=76%, and permanent set=2.9%. Stress relaxation stands for the percent retention in stress when a yarn is kept at 200% elongation for 30 minutes. Permanent set is the percentage of remaining length to original length ten minutes after the tention has been released from a yarn which has been held at 200% elongation for 30 minutes.

The filaments obtained were found to be less tacky than the usual polyurethane elastic yarns. The same procedures as in the example were carried out five times, so that the viscosities obtained after heating process were measured to be in the range of 1,100 to 1,250 poises for each at 30° C., and the solutions were stable to such an extent that no changes were observed in a storage for 6 months. This fact shows a good reproducibility of the process of the invention. The filaments in this example had good stabilities against light, bleaching agents and hydrolytic media, compared with the usual elastic polyurethane yarns. These relationships are shown in Table I. Aqueous sodium hypochlorite solution was used as bleaching agent. Aqueous sodium hydroxide solution was used as hydrolytic medium. As a comparative example, conventional filaments were dry spun from the polyurethane solution prepared by using ethylene diamine alone, free from water in this example, the solution becoming yellow after the heating process and was unstable during storage.

0.26 gram of water. The stable polyurethane solution obtained had a viscosity of 1,1000 poises at 30° C. and had good spinnability. The filaments dry spun from the solution had the same properties as in the preceding examples.

The relationships between the solution viscosity and time of heating at 80° C. in Examples 1 to 3 are shown in FIG. 1. The change of the reduced viscosity of the polymer in the heating porcess of this example is shown in FIG. 2.

EXAMPLE 4

The isocyanate-terminated prepolymer of the preceding example was diluted with 100 grams of N,N-dimethyl formamide. Then the prepolymer solution was added with vigorous stirring to a solution of 5.56 grams of p-xylylene diamine and 1.36 grams of water in 60 grams of N,N-dimethylformamide. After 2 hours, the reaction mixture was heated at 70° C. and kept at this temperature for 12 hours, producing a viscous solution having a viscosity of 1,800 poises at 30° C. and good spinnability. The solution was stable during storage for 6 months, showing no changes in properties. The filaments produced by the dry spinning of the solution similar to the preceding example had the following properties: denier=278, tensile strength=0.72 g./d., tensile elongation=780%, stress relaxation=73% and permanent set=3.1%.

EXAMPLE 5

Poly(ethylene adipate)glycol (115.2 grams) of a molecular weight of 1,440 was reacted with 23.1 grams of p-phenylene diisocynate in 200 grams of N,N-dimethylacetamide at 45° C. for 3 hours. After cooling to room temperature, the solution was added with vigorous stirring to a solution of 6.84 grams of hexamethylene diamine, 0.30 gram of water and 0.08 gram of N,N-diethylaminopropylamine in 100 grams of N,N-dimethylacetamide. After 5 hours, the reaction mixture was heated at 80° C. for 15 hours. The polymer solution obtained, which had a reproducible viscosity of 1,040 poises at 30° C., was stable during storage for 6 months. The solution was extruded into a water bath heated to 60° C. through a 20-hole spinneret (0.12 mm. in diameter). The produced multifilaments were wound up at 15 m./min. After washing by water for one hour, the multifilaments, characterized by good separation of the single filaments, were dried at 130° C. for 30 minutes, showing the following properties: denier=215, tensile strength=0.69 g./d., tensile elongation=730%, stress relaxation=70% and permanent set=3.8%.

TABLE I

Stabilities against light, aqueous sodium hypochlorite and sodium hydroxide solutions

| | Fade-Ometer exposure for 8 hrs. | | Aqueous NaClO solution (0.5%)* | | Aqueous NaOH solution (1%)* | |
| --- | --- | --- | --- | --- | --- | --- |
| | Tensile strength retention, percent | Color of filaments | Tensile strength retention, percent | Color of filaments | Tensile strength retention, percent | Color of filaments |
| Example 1 | 86.2 | Colorless | 96.7 | Light yellow | 87.4 | Colorless. |
| Comparative example | 38.4 | Yellow | 29.5 | Brown | 35.1 | Do. |

*Filaments were immersed in at 50 C. for 24 hours.

EXAMPLE 2

A similar procedure to the preceding example was carried out, except that 0.43 grams of water was employed instead of 0.26 gram of water. The stable polyurethane solution obtained had a viscosity of 1,200 poises at 30° C. and had good spinnability. The filaments obtained by dry spinning of the solution had the same properties as in the preceding example.

EXAMPLE 3

The similar procedure to Example 1 was carried out, except that 0.86 gram of water was employed instead of

EXAMPLE 6

Poly(tetramethylene oxide) glycol (110.4 grams) of a molecular weight of 1,380 was reacted with 36.0 grams of 4,4'-diphenylmethane diisocyanate to yield the corresponding prepolymer but the process of Example 1. The prepolymer was diluted with 300 grams of dimethyl sulfoxide. Then the prepolymer solution was added with vigorous stirring to a solution of 4.4 grams of ethylene diamine hydrate and 50 grams of dimethyl sulfoxide. After 2 hours, the reaction mixture was heated to 80° C. and kept at this temperature for 18 hours. The polymer solution obtained, which had a reproducible viscosity of 840 poises at 30° C., had good spinnability and was stable during storage for 6 months. The filaments were wet spun as in the preceding example, having the following properties: denier=250, tensile strength=0.73 g./d., tensile elongation=780%, stress relaxation=78% and permanent set=2.4%.

EXAMPLE 7

The polymer solution in Example 1 was poured onto a glass sheet to form a layer 0.02 m. thick and the solvent was evaporated by heating at 80° C. under reduced pressure (2 mm. Hg) for 6 hours. A highly elastic non-tacky film was obtained and it showed the following properties: tensile strength=380 kg./cm.$^2$, tensile elongation 810%, stress relaxation=70% and permanent set=3.0%.

EXAMPLE 8

The procedure similar to that disclosed in Example 5 was carried out, except that 41.8 grams of isopropylidene-bis-4,4'-cyclohexylisocyanate and 6.73 grams of 1,4-cyclohexane diamine were employed instead of 23.1 grams of p-phenylene diisocyanate and 6.84 grams of hexamethylene diamine. After heating, the polymer solution obtained, which had a reproducible viscosity of 960 poises at 30° C., had good spinnability and was stable during storage for as long as 6 months. The filaments were wet spun as in Example 5, having the following properties: denier=268, tensile strength=0.62 g./d., tensile elongation=830%, stress relaxation=71% and permanent set=4.5%.

What is claimed is:

1. The method of improving the stability of polyurethane solutions which comprises (a) reacting one or more isocyanate-terminated prepolymers prepared by the reaction of one or more organic diisocyanates and one or more polyhydroxy compounds having two terminal hydroxyl grups and having a molecular weight of about 500 to 3,000, with a chain extender solution containing water and one or more non-aromatic diprimary diamines, the mole ratio of said diamines to prepolymers being 0.80 to 0.96 the mole ratio of said water to prepolymers being equal to at least two times as much as 1 minus the mole ratio of said diamines, the chain extending reaction being effected by adding the prepolymer solution into the chain extender solution and after the content of isocyanate groups in the reaction meduim has fallen substantially to zero, (b) heating the reaction mixture at from 60° C. to 85° C. for 5 to 30 hours with stirring.

2. The method of claim 1 wherein said polyhydroxy compound is poly(caprolactone)glycol.

3. The method of claim 1 wherein said organic diisocyanate is 4,4'-diphenylmethane diisocyanate.

4. The method of claim 1 wherein said organic diisocyanate is isopropylidene-bis-4,4'-cyclohexylisocyanate.

5. The method of claim 1 wherein said non-aromatic diprimary diamine is an aliphatic diamine.

6. The method of claim 1 wherein said non-aromatic diprimary diamine is ethylene diamine.

7. The method of claim 1 wherein said non-armoatic diprimary diamine is a cyclo-aliphatic diamine.

8. The method of claim 1 wherein said non-aromatic diprimary diamine is 1,4-cyclohexane diamine.

9. The method of claim 1 wherein said non-aromatic diprimary diamine is an aliphatic diamine containing at least one aromatic ring.

10. The method of claim 1 wherein said non-aromatic diprimary diamine containing at least one aromatic ring is p-xylylene diamine.

11. Polyurethane solutions made by the method claimed 1.

References Cited

UNITED STATES PATENTS

| 3,347,764 | 10/1967 | Matsumoto et al. | 204—159.21 |
| 3,020,064 | 2/1962 | Bchrends et al. | 260—67 FP |
| 3,376,264 | 4/1968 | Wieden et al. | 260—75 |
| 3,428,611 | 2/1969 | Brotherton et al. | 260—75 |

OTHER REFERENCES

Free Radical Induces Cationic Polymerization, Chemical & Engineering News, Sept. 6, 1966, pp. 40–41.

DONALD E. CZAJA, Primary Examiner

M. J. WELSH, Assistant Examiner

U.S. Cl. X.R.

260—77.5 AA